3,326,850
POLY(1,3-OXAZA-2,4-DIONE/AMIDE)POLYMERS
Rudolph J. Angelo, Wilmington, Del., assignor to E. I.
du Pont de Nemours and Company, Wilmington, Del.,
a corporation of Delaware
No Drawing. Filed Mar. 4, 1963, Ser. No. 262,387
9 Claims. (Cl. 260—47)

This invention relates to a novel class of polymers and a process for preparing them.

The novel class of polymers are poly(1,3-oxaza-2,4-dione/amides) hereinafter called poly(oxazadione/amides). These polymers are extremely stable at high temperatures and are inert to most solvents at all temperatures. In the form of shaped articles, e.g. films, fibers, rods, tubes, etc., they are substantially colorless, flexible, strong, and, in short, have a multitude of desirable properties. Their stability, although a very desirable characteristic in many end uses, makes these polymers very difficult to form into shaped articles. For example, they cannot be melt extruded easily because of their thermal stability as characterized by their high melting points.

One object of this invention is to overcome this particular shortcoming and provide a process for producing shaped articles of the poly(oxazadione/amides). The process that has been discovered involves first forming a shapeable intermediate, then shaping the intermediate into a useful article and, thereafter, converting the intermediate in the form of the shaped article into the stable polymer containing the oxazadione rings.

Specifically, the process for producing shaped articles of poly(oxazadione/amides) involves forming a polyamide of a carbonate ester of a monohydroxy, dibasic acid in which the hydroxyl group is as close as possible to a carboxyl group in accordance with the limitation of the compound, i.e. ortho when the acid is aromatic and attached to the same carbon atom as a carboxyl group when the acid is aliphatic. This is accomplished by forming the acid halide or anhydride after converting to the carbonate ester and then reacting at least one acid halide or anhydride of the carbonate ester of the defined acid with at least one diamine. In the next step, the polyamide is formed into a useful article such as a film, filament, tube, etc., by the processes well known in the art such as casting, extruding or the like. Thereafter, the shaped article of the polyamide is cyclized to the corresponding poly(oxazadione/amide) by heating the article.

The final cyclized products, the poly(oxazadiones/amide), are of the following general formula:

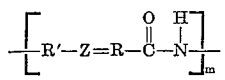

wherein R' is arylene or alkylene,

R is a trivalent organic radical of at least 2 carbon atoms, and

Z is the radical

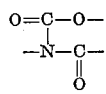

wherein the valences from O and C are attached to R, to adjacent carbon atoms of an aromatic ring when R is aromatic and are attached to the same carbon atom where R is aliphatic and wherein $m$ is an integer sufficiently high to provide a film-forming polymer.

The starting materials in the first mentioned process are monohydroxy, dibasic acids and diamines. The acids are characterized by having a carboxyl group ortho to the hydroxyl group when the acid is aromatic and having a pair of carboxyl and hydroxyl groups attached to the same carbon atom when the acid is aliphatic. In the process, the hydroxyl group of the monohydroxy, dibasic acid is blocked by esterification with alkyl or aryl halocarbonates preparatory to reaction with the diamine to form the polyamide.

The monohydroxy, dibasic acids useful in the present invention include:

4-hydroxy isophthalic acid;
2-hydroxy isophthalic acid;
2-hydroxy terephthalic acid;
3,3'-dicarboxy-4-hydroxy biphenyl;
3,3'-dicarboxy-4-hydroxy diphenyl methane;
1-hydroxy-2,3-dicarboxy naphthalene;
1-hydroxy-2,6-dicarboxy naphthalene;
tartronic acid;
3-hydroxy-4,4'-dicarboxy diphenyl methane;
3-hydroxy-4,4'-dicarboxy biphenyl;
3,3'-dicarboxy-4-hydroxy diphenyl ether;
3-hydroxy-4,4'-dicarboxy diphenyl ether;
3,3'-dicarboxy-4-hydroxy diphenyl sulfide;
3-hydroxy-4,4'-dicarboxy diphenyl sulfide;
3,3'-dicarboxy-4-hydroxy diphenyl sulfone;
3-hydroxy-4,4'-dicarboxy diphenyl sulfone;
malic acid,
citramalic acid;
1-hydroxy-1,4-dicarboxy cyclohexane.

The diamines useful in the present invention are those having the following structural formula:

$$H_2N—R'—NH_2$$

wherein R' is a divalent organic radical (aromatic, aliphatic, cycloaliphatic, heterocyclic, bridged aromatic or substituted derivatives thereof, etc.), preferably an aromatic radical selected from the group consisting of phenylene, naphthylene, biphenylene, anthrylene, furylene, benzfurylene and

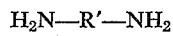

wherein $R^2$ is selected from the group consisting of alkylene of 1–4 carbon atoms,

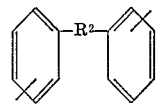

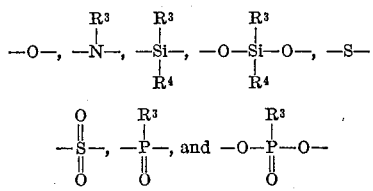

where $R^3$ and $R^4$ are alkyl or aryl.

Among the diamines which are suitable for use in the present invention are:

meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino-naphthalene;
3,3'-dimethyl-4,4'-diamino-biphenyl;
3,3'-dimethoxy benzidine;
2,4-bis-(beta-amino-t-butyl)toluene;

bis-(para-beta-amino-t-butyl-phenyl) ether;
para-bis-(2-methyl-4-amino-pentyl) benzene;
para-bis-(1,1-dimethyl-5-amino-pentyl)benzene;
m-xylylene diamine;
p-xylylene diamine;
bis-(para-amino-cyclohexyl)methane;
hexamethylene diamine;
heptamethylene diamine;
octamethylene diamine;
nonamethylene diamine;
decamethylene diamine;
3-methyl-heptamethylene diamine;
4,4-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
$H_2N(CH_2)_3O(CH_2)_2O(CH_2)_3NH_2$;
$H_2N(CH_2)_3S(CH_2)_3NH_2$;
$H_2N(CH_2)_3N(CH_2)_3NH_2$;

and mixtures thereof.

In the process, the intermediate polyamides are prepared from diamines and diacid halides or anhydrides of the carbonate ester of the monohydroxy, dibasic acid. In the first step, which step is actually a preliminary step, the carbonate ester of the hydroxy, dibasic acid is prepared to block or protect the hydroxyl group during subsequent polymerization. For this purpose, an alkyl or aryl halocarbonate of the formula

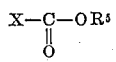

is used wherein X is halogen of atomic weight greater than 19 and $R^5$ is lower alkyl or aryl. Some useful halocarbonates include methyl, ethyl, propyl, isopropyl, butyl (4 isomers), amyl (8 isomers) or phenyl chlorocarbonates.

In a typical example, the alkyl chlorocarbonate, e.g. methyl chlorocarbonate, is added in about 10 mole percent excess over the stoichiometric amount to a solution of the hydroxy acid, e.g. 4-hydroxy isophthalic acid in acetone at a temperature of 0–5° C., the solution also containing a basic catalyst, e.g. triethylamine. The basic catalyst functions as a solubilizing agent for the acid and also as an acid acceptor. Any tertiary amine, e.g. triethylamine, pyridine, etc. may be used in this capacity. The temperature maintained during this particular reaction is preferably low (−20°−+10° C.) which temperature may be maintained using an ice or brine bath. The useful solvents for this step include acetone, methyl ethyl ketone, methyl isobutyl ketone, heptane, benzene, tetrahydrofuran, dioxane or mixtures thereof. After stirring the reaction mixture for an extended period of at least one hour, acetic acid, hydrochloric acid, dilute sulfuric acid or dilute nitric acid is added. The resulting mixture is then added to crushed ice to yield the alkyl carbonate ester of the hydroxy acid.

In the next step, the diacid halide or anhydride of the substituted hydroxy acid is formed. This is done in order to increase the activity of the carboxyl group for the subsequent polymerization. The diacid halide is formed by the addition of an excess of a thionyl halide, a phosphorus oxyhalide, an oxylyl halide, or a carbonyl halide, e.g. thionyl chloride, phosphorus trichloride, or phosgene. The anhydride is formed by the addition of an anhydride of a fatty acid (acetic anhydride) or an anhydride of an alpha-halogenated fatty acid (trifluoroacetic anhydride, trichloroacetic anhydride, difluoroacetic anhydride, dichloroacetic anhydride). Pyridine or dimethylformamide or dimethylacetamide is added in order to catalyze the reaction. The reaction may be conducted in an inert solvent such as o-xylene. Excess chlorinating agent is removed and the organic acid chloride is purified by recrystallization and/or vacuum distillation.

In the next step, the diacid chloride is reacted with the diamine to form the polyamide. In the solution method, the diacid chloride is added to a solution of the diamine in a solvent. As a solvent, N,N'-dimethylacetamide may be used. Other possible solvents include N,N'-dimethylformamide. The product of this step is the intermediate polymeric composition containing the shapeable polyamide having the following formula:

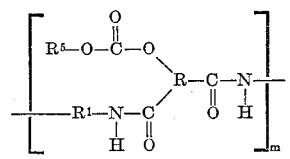

wherein R is a trivalent organic radical of at least 2 carbon atoms; $R^1$ is arylene or alkylene and includes the specific radicals shown for the diamines; $R^5$ is lower alkyl (1–5 carbon atoms) or aryl.

The polymeric composition may then be cast or extruded as a film, filament, rod, tube, etc. The resulting shaped article is then heated to a temperature of about 200–300° C., preferably in vacuo and in the presence of a flowing inert gas such as nitrogen, for a time sufficient to cyclize the polyamide to the poly(oxazadione/amide). The flowing inert gas serves to remove by-product alcohol and helps to minimize the oxidative effects of the high temperature. It should be understood that this intermediate composition need not be composed completely of the polyamide. Some of the poly(oxazadione/amide) may also be present. However, this composition must contain sufficient polyamide to be shapeable. The time required for cyclizing will depend upon the particular polyamide, the temperature used, the amount of polyamide present in the intermediate, etc., and will vary from a few minutes to an hour or more.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [1] known to those skilled in the art. The majority of the infrared spectra herein were taken on pressed films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, Volume I, pages 261–9 (May 1946) as:

$$\text{Inherent viscosity} = \frac{\ln \text{ relative viscosity}}{C}$$

where relative viscosity is the ratio of the solution viscosity to the solvent viscosity, and C is the concentration of solute in solution measured as grams of polymer per 100 ml. of solution.

EXAMPLE 1

The methyl carbonate of 4-hydroxy isophthalic acid is prepared as follows:

Methyl chlorocarbonate is added in 10% molar excess over a period of one hour to a cooled solution of 4-hy-

---

[1] W. M. D. Bryant and R. C. Voter, Journal of American Chemical Society, 75, 6113 (1953); and F. W. Billmeyer, "Textbook of Polymer Chemistry," Chapter 7, Interscience Publishers, 1957.

droxy isophthalic acid (91 g.; 0.5 mole) in 500 ml. of acetone containing 152 g. (1.5 moles) of triethylamine. The triethylamine causes the 4-hydroxy isophthalic acid to dissolve in the acetone and also functions as an acid acceptor. The reaction mixture is allowed to stir an additional hour at 0–5° C. The slurry thus obtained is treated with 500 ml. of 50% hydrochloric acid and added to crushed ice, from which the resulting product is separated. Chemical analysis of a recrystallized sample confirms that the product is the desired methyl carbonate of 4-hydroxy isophthalic acid.

Thionyl chloride (500 g.; 4.2 moles) is added to 100 g. (0.417 mole) of the methyl carbonate of 4-hydroxy isophthalic acid. Five drops of pyridine are added. The mixture is stirred for five hours at 60–70° C. The slightly cloudy solution is allowed to stir overnight at room temperature. The excess thionyl chloride is stripped at 50° C. under vacuum, leaving a viscous oil. This oil is kept under a high vacuum (less than 0.1 mm.) for 6 hours to remove the last traces of thionyl chloride. The oil crystallizes with difficulty to the white, solid diacid chloride of 4-hydroxy isophthalic acid.

A stream of dry nitrogen gas is passed over 20.0 g. of freshly distilled N,N'-dimethylacetamide containing 1.08 g. (0.01 mole) of meta-phenylene diamine. The solution is stirred and cooled in a Dry Ice/acetone bath until it solidifies. Then it is warmed until a slurry is obtained. To this stirred slurry is added 2.77 g. (0.01 mole) of the above diacid chloride. Stirring is continued for 1½ hours as the mixture comes to room temperature. A slightly viscous yellow solution is obtained which has an inherent viscosity of 0.14 (as a 0.5% by weight solution in dimethylacetamide). The solution is cast onto a glass plate, yielding a self-supporting polyamide film upon evaporation of the solvent.

The film cast on a steel plate is treated at 300° C. in a vacuum oven under a stream of nitrogen to cause cyclization. The film is slightly lighter in color and is more flexible than the polyamide film mentioned above. The infrared spectrum of this film confirms that its chemical structure is that of poly(benzoxazinedione/polyamide).

EXAMPLES 2–3

When the above diacid chloride is added to equimolar amounts of bis(4-aminophenyl) ether and of bis(4-aminophenyl) methane, using the procedure given in Example 1, the corresponding polyamides form and convert, on heating at 300° C., into the corresponding polymeric benzoxazinedione/amines.

EXAMPLE 4

Substitution of 1-hydroxy-2,6-dicarboxy naphthalene for 4-hydroxy isophthalic acid in Example 1 leads to the corresponding poly(naphthoxazinedione/amide).

EXAMPLES 5–6

When the methyl carbonate ester of 2-hydroxy isophthalic acid or 3,3'-dicarboxy-4-hydroxy biphenyl is substituted for the methyl carbonate ester of 4-hydroxy isophthalic acid in Example 1, the corresponding polyarylamide is produced. Each of these is cast into film and then converted to the corresponding poly(benzoxazine-2,4-dione/amide) by heating at 300° C. for 30 minutes. A tough, flexible film is produced in each case.

The poly(oxazadione/amides) of this invention find many applications in a wide variety of physical shapes and forms. Among the most significant of these forms are films and fibers. Films and fibers of this polymer not only possess excellent physical properties at room temperature, but retain their strength at elevated temperatures for prolonged periods of time. Because of the solubility of the polymer precursors in the preferred processes of preparation, these polymer precursors may be processed into shaped articles such as films, fibers, tubes, rods, sheets and discs by conventinoal techniques, and then converted into the final high-melting, relatively intractable cyclized polymer, the poly(oxazadione/amide).

The final shaped article may consist of the heterocyclic polymer alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either along or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed from the polymer of this invention may be used wherever films have heretofore been used. They serve advantageously in an extensive variety of wrapping, packaging and bundling applications. Additionally, the film-forming polymer may be used in automobile and aviation interior head lining materials, decorative trim, high temperature electrical insulation, in the form of corrosion-resistant pipe, duct work, containers and container linings, and the laminating structures mentioned previously. In fiber form, the polymer of the present invention offers possibilities for high temperature electrical insulation, protective clothing and curtains, filtration media, packing and gusseting materials, brake linings and clutch facings.

What is claimed is:

1. Poly (1,3-oxaza-2,4-dione/amide) having the structural formula:

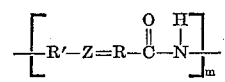

wherein R' is a radical having not more than 20 carbon atoms and is a radical selected from the group consisting of arylene and alkylene;

R is a trivalent organic radical of at least 2 carbon atoms and not more than 13 carbon atoms and containing no atoms other than carbon, hydrogen, sulfur and oxygen;

Z is the radical

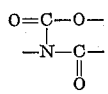

the valences from O and C being attached to R, to adjacent carbon atoms of an aromatic ring when R is aromatic and to the same carbon atom when R is aliphatic; and $m$ is an integer sufficiently high to provide a polymer having an inherent viscosity of at least 0.10 as measured on a 0.5% by weight solution in dimethylacetamide at room temperature.

2. Poly (1,3-oxaza-2,4-dione/amide) as in claim 1 wherein R' is

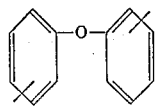

3. Poly (1,3-oxaza-2,4-dione/amide) as in claim 1 wherein R' is

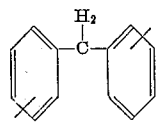

4. Poly (1,3-oxaza-2,4-dione/amide) as in claim 1 wherein R' is phenylene.

5. Poly (1,3-oxaza-2,4-dione/amide) as in claim 1 wherein R is

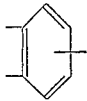

6. Poly (1,3-oxaza-2,4-dione/amide) as in claim 1 wherein R is

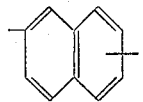

7. Poly (1,3-oxaza-2,4-dione/amide) as in claim 1 wherein R is

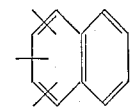

8. Poly (1,3-oxaza-2,4-dione/amide) as in claim 1 wherein R is

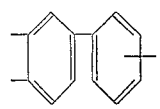

9. A polyamide having the structural formula:

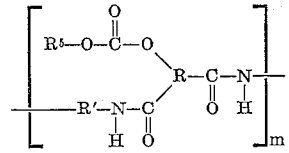

wherein R' is a radical having not more than 20 carbon atoms and is a radical selected from the group consisting of arylene and alkylene;

R is a trivalent organic radical of at least 2 carbon atoms and not more than 13 carbon atoms and containing no atoms other than carbon, hydrogen, sulfur and oxygen;

$R^5$ is selected from the group consisting of lower alkyl and aryl; and $m$ is an integer sufficiently high to provide a polymer having an inherent viscosity of at least 0.10 as measured on a 0.5% by weight solution in dimethylacetamide at room temperature.

References Cited

UNITED STATES PATENTS 3,244,675   4/1966   Angelo _____ 260—78

WILLIAM H. SHORT, *Primary Examiner.*

H. D. ANDERSON, J. C. MARTIN, *Assistant Examiners.*